No. 682,846. Patented Sept. 17, 1901.
B. FISCHER.
STIRRING APPARATUS FOR UNDRIED MALT.
(Application filed Sept. 11, 1900.)

(No Model.) 2 Sheets—Sheet 2.

UNITED STATES PATENT OFFICE.

BERNHARD FISCHER, OF HEIDELBERG, GERMANY.

STIRRING APPARATUS FOR UNDRIED MALT.

SPECIFICATION forming part of Letters Patent No. 682,846, dated September 17, 1901.

Application filed September 11, 1900. Serial No. 29,673. (No model.)

*To all whom it may concern:*

Be it known that I, BERNHARD FISCHER, a subject of the Grand Duke of Baden, residing at Heidelberg, in the Grand Duchy of Baden, in the German Empire, have invented certain new and useful Improvements in Stirring Apparatus for Undried Malt, (for which I have applied for patents in Germany, dated February 24, 1900, and in France, dated August 11, 1900,) of which the following is a specification.

My present invention relates to improvements in stirring apparatus for undried malt, in which the air is injected into the malt, being previously moistened in a similar manner to that employed in pneumatic malting plants.

Figure 1:
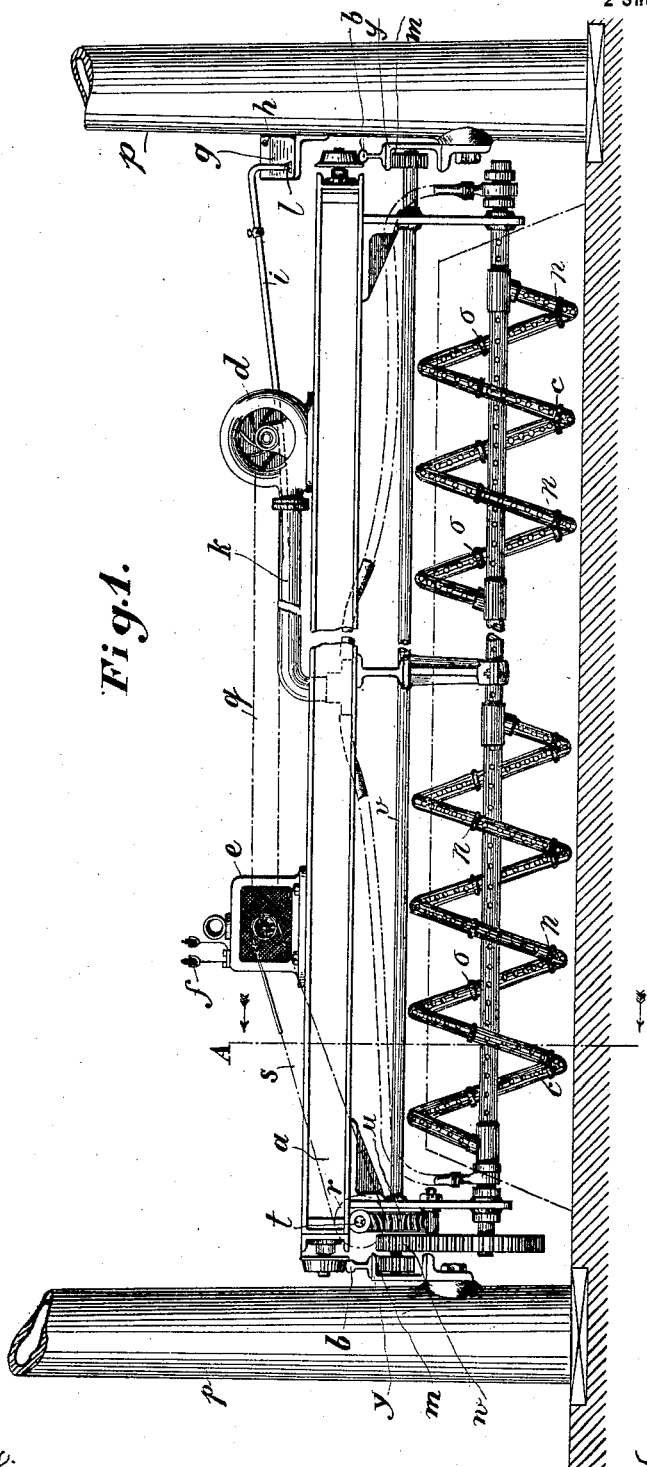
Figure 2:
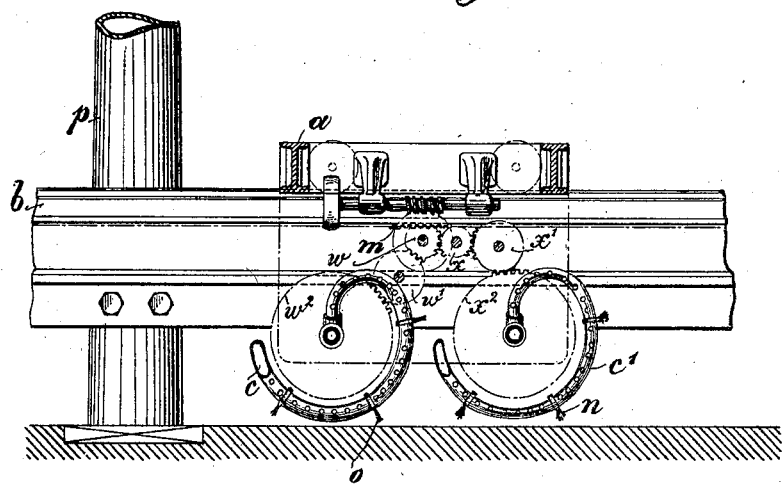

In the accompanying drawings, illustrating my invention, Figure 1 is a front elevation, and Fig. 2 a section on line A B of Fig. 1.

My improved apparatus consists, essentially, of a carriage $a$, supported above the malt-floor on rails $b$. From this carriage two spirally-wound tubes $c$ and $c'$, having a large number of perforations, are suspended and are arranged to rotate in opposite directions. A ventilator or blower $d$ forces air into these tubes $c\ c'$ from both sides, while the carriage moves slowly along the rails $b$. An electromotor $e$, which is supplied with the electric current through a sliding contact $f$, in a similar manner to an electric tram-car with overhead trolley, drives the ventilator or blower, rotates the tubes $c\ c'$, and moves the carriage. The blower $d$ is driven from the electromotor $e$ by means of a belt $q$. In order to rotate the tubes $c$, a pulley $r$, driven from the electromotor $e$ by the belt $s$, is secured on a shaft supported in bearings on the carriage $a$. On the same shaft a worm $t$ is secured, which engages with a worm-wheel $u$ on a shaft $v$, that extends throughout the entire length of the carriage. On the ends of this shaft $v$ are secured spur-wheels $m$, which engage in racks $y$, secured to the standards $p$. On the shaft $v$ is secured a spur-wheel $w$, which rotates the coils $c\ c'$ through the medium of the spur-wheels $w'\ w^2$ and $x'\ x^2$, respectively. Alongside one of the rails $b$ a trough or gutter $g$ is arranged. This trough or gutter is continuously supplied with slightly-warmed water and has an overflow-pipe $h$. A pipe $i$ connects the trough $g$ with the air-pipe $k$, and a strainer $l$ is provided at the end of the pipe $i$ in the trough, any suitable form of nozzle being provided on the other end. On the blower $d$ being put into action water will be sucked up through the pipe $i$ from the trough, and passing into the air pipe $k$ will moisten the compressed air. The tubes $c\ c'$ rotate slowly, the one moving the malt toward the right hand and the other toward the left, the carriage being simultaneously moved slowly by means of the toothed rack $m$. On the return of the carriage the malt which has been pushed toward one end during the advance of the carriage is pushed back again and a uniform depth of malt is obtained. As the malt-floor cannot be made so smooth that the tubes $c\ c'$ can glide along the same, the said tubes $c\ c'$ are provided with small brushes $n$ or rubber plates $o$, which move the grain not acted upon by the tubes. In order to simplify the construction, the rails $b$ should preferably be arranged beside the pillars $p$ of the malt-house.

A traverser or sliding platform can be arranged at one end or in the middle of the malt-house at right angles to the rails $b$, so that the carriage can be moved to neighboring rails.

I am aware that rotary stirrers caused to travel over the floor by means of a carriage propelled by an electric motor or the like have before been used in apparatus for stirring grain or malt, and also that perforated spiral tubes suitably rotated and through which moist air is supplied have been used in malt-drying apparatus and the like. As is known, it is necessary in treating the grain that the carbonic acid generated in the same be removed, so that no mildew is formed. For this purpose in the pneumatic malting plants, moistened air is blown into the malt, which is contained in an entirely or partially closed receptacle. In hand malting-houses the same effect is obtained by turning over the malt with the shovel. My system lies intermediate between the pneumatic and hand-malting methods. In my system the grain is freely exposed on the floor, and the moistened air is injected into the same through the spiral tubes, which at the same time turn over the malt.

What I claim, and desire to secure by Letters Patent of the United States, is—

1. In a stirring apparatus for undried malt, the combination of a carriage $a$ that can be moved backward and forward, a motor $e$ disposed on said carriage, spiral tubes $c$, $c'$ arranged to rotate in opposite directions, said tubes being provided with perforations, and a blower $d$ disposed on said carriage, said blower forcing damp air through the perforations in the tubes $c$, $c'$, substantially as described and for the purpose specified.

2. In a stirring apparatus for undried malt, the combination of a carriage $a$ that can be moved backward and forward, a motor $e$ disposed on said carriage, spiral tubes $c$, $c'$ arranged to rotate in opposite directions, said tubes being provided with perforations, a blower $d$ disposed on said carriage, an air-pipe $k$ to conduct air under pressure from the blower $d$ to the spiral tubes $c$, $c'$, and a pipe $i$ adapted to conduct water from a trough $g$ to the pipe $k$ in order to moisten the air, substantially as described and for the purpose specified.

3. In a stirring apparatus for undried malt, the combination of a carriage $a$ that can be moved backward and forward, a motor $e$ disposed on said carriage, spiral tubes $c$, $c'$ arranged to rotate in opposite directions, provided with perforations, rubber plates $o$ attached to said tubes, adapted to sweep the floor, a blower $d$ disposed on said carriage, an air-pipe $k$ to conduct air under pressure from the blower $d$ to the spiral tubes $c$, $c'$, and a pipe $i$ adapted to conduct water from a trough $g$ to the pipe $k$ in order to moisten the air, substantially as described and for the purpose specified.

4. In a stirring apparatus for undried malt, the combination of a carriage $a$ that can be moved backward and forward, a motor $e$ disposed on said carriage, spiral tubes $c$, $c'$ arranged to rotate in opposite directions, provided with perforations, brushes $n$ attached to said tubes, adapted to sweep the floor, a blower $d$ disposed on said carriage, an air-pipe $k$ to conduct air under pressure from the blower $d$ to the spiral tubes $c$, $c'$, and a pipe $i$ adapted to conduct water from a trough $g$ to the pipe $k$ in order to moisten the air, substantially as described and for the purpose specified.

In testimony whereof I have hereunto set my hand in the presence of two witnesses.

BERNHARD FISCHER.

Witnesses:
 JACOB ADRIAN,
 H. W. HARRIS.